United States Patent
Hess et al.

(10) Patent No.: US 12,270,662 B2
(45) Date of Patent: Apr. 8, 2025

(54) MAP GENERATION USING TWO SOURCES OF SENSOR DATA

(71) Applicant: Lyft, Inc., San Francisco, CA (US)

(72) Inventors: Wolfgang Hess, Munich (DE); Luca Del Pero, London (GB); Daniel Sievers, Mountain View, CA (US); Holger Rapp, Munich (DE)

(73) Assignee: Lyft, Inc., San Francisco, CA (US)

(*) Notice: Subject to any disclaimer, the term of this patent is extended or adjusted under 35 U.S.C. 154(b) by 836 days.

(21) Appl. No.: 16/917,738

(22) Filed: Jun. 30, 2020

(65) Prior Publication Data
US 2021/0404814 A1    Dec. 30, 2021

(51) Int. Cl.
| | | |
|---|---|---|
| G01C 21/32 | (2006.01) | |
| G06T 7/00 | (2017.01) | |
| G06T 7/73 | (2017.01) | |
| G06T 17/05 | (2011.01) | |
| G06V 20/56 | (2022.01) | |

(52) U.S. Cl.
CPC ............ *G01C 21/32* (2013.01); *G06T 7/75* (2017.01); *G06T 7/97* (2017.01); *G06T 17/05* (2013.01); *G06V 20/56* (2022.01); *G06T 2207/30241* (2013.01); *G06T 2207/30252* (2013.01)

(58) Field of Classification Search
CPC ........ G01C 21/26; G01C 21/28; G01C 21/30; G01C 21/32; G06T 17/05; G08G 1/0969; G08G 1/20; G08G 1/202
See application file for complete search history.

(56) References Cited

U.S. PATENT DOCUMENTS 11,512,964 B2 * 11/2022 Chen ................. G01C 21/3841
2018/0307941 A1 * 10/2018 Holz ................. G06V 30/1988
(Continued)

FOREIGN PATENT DOCUMENTS

WO    WO-2018140701 A1 *  8/2018 ............ G01C 11/02

OTHER PUBLICATIONS

Zhen et al., "A Joint Optimization Approach of LiDAR-Camera Fusion for Accurate Dense 3-D Reconstructions," Oct. 2019, in IEEE Robotics and Automation Letters, vol. 4, No. 4, pp. 3585-3592 (Year: 2019).*

(Continued)

*Primary Examiner* — Emily C Terrell
*Assistant Examiner* — Julia Z. Yao
(74) *Attorney, Agent, or Firm* — Lee Sullivan Shea & Smith LLP

(57) ABSTRACT

Examples disclosed herein may involve a computing system that is operable to (i) receive first data of one or more geographical environments from a first type of localization sensor, (ii) receive second data of the one or more geographical environments from a second type of localization sensor, (iii) determine constraints from the first data and the second data, (iv) determine shared pose data associated with both of the first data and the second data using the constraints determined from both the first data and the second data by determining one or more sequences of common poses between respective poses generated from each of the first and second data, wherein the shared pose data provides a common coordinate frame for the first data and the second data, and (v) generate a map of the one or more geographical environments using the determined shared pose data.

20 Claims, 9 Drawing Sheets

(56) References Cited

U.S. PATENT DOCUMENTS

| | | | |
|---|---|---|---|
| 2019/0023266 A1* | 1/2019 | Kouri | G06T 7/00 |
| 2019/0301873 A1* | 10/2019 | Prasser | G01C 21/3848 |
| 2019/0302801 A1* | 10/2019 | Zlot | H04W 4/46 |
| 2021/0003404 A1* | 1/2021 | Zeng | G01C 21/3605 |
| 2021/0334988 A1* | 10/2021 | Xiao | G01S 17/931 |

OTHER PUBLICATIONS

Shin et al., "DVL-SLAM: sparse depth enhanced direct visual-LiDAR SLAM," Aug. 2019, Auton Robot (2020), vol. 44, pp. 115-130 ( Year: 2019).*

Jiang et al., "A Simultaneous Localization and Mapping (SLAM) Framework for 2.5D Map Building Based on Low-Cost LiDAR and Vision Fusion," Applied Sciences. 2019; 9(10):2105. https://doi.org/10.3390/app9102105 (Year: 2019).*

Qin et al., "A General Optimization-based framework for Global Pose Estimation with Multiple Sensors," arXiv, in Computing Research Repository (CoRR), 2019, vol. abs/1901.03642 [online]. [retrieved on Jan. 11, 2019]. Retrieved from the Internet <URL: http://arxiv.org/abs/1901.03642> (Year: 2019).*

* cited by examiner

MAP GENERATION USING TWO SOURCES OF SENSOR DATA

FIELD OF THE INVENTION

The present disclosure relates to a method of generating a map using at least two sources of sensor data. More particularly, the present disclosure relates to a method of combining these sources of sensor data to generate map data that can be used to localize vehicles equipped with any of the types of sensor used to capture any of the sensor data.

BACKGROUND

Various computer vision techniques have been developed that can be used to build accurate maps of environments. In particular, a variety of techniques and algorithms have been developed that enable three-dimensional reconstruction of environments from various input data.

Vehicles may be equipped with sensors that are placed in or around the vehicle so as to collect information for building maps, localizing the vehicle, identifying objects and situations the vehicles observes, and for any other uses for data gathered in the environment as the vehicle moves along trajectories through the environment.

Given the various types of data being gathered, mapping techniques use data from each of the available sensors, such as optical imaging sensors, LIDAR, microwave, and/or ultrasound sensors, as independent input data to generate map data or determine localization estimates of the vehicle using each sensor. As a result, maps are typically generated independently based on the input sensor type, so each type of map usually has its own associated constraints and limitations based on the type of information obtained by the various sensors and the map building techniques applied to the sensor data. For example, LiDAR captures can sometimes overestimate positions on a road surface while visual captures can sometimes underestimate positions on a road surface, resulting in warping constraints in maps generated using each respective sensor type. Due to the format and characteristics of each type of sensor data, it is often difficult to combine and align maps (sometimes termed "registering," i.e. matching one or more points that in reality represent the same physical object/position between maps/datasets) generated from two different types of sensor data accurately, or without errors, as there is no global transformation technique that will accurately align one map with all of its local constraints to another type of map.

SUMMARY

In one aspect, the disclosed technology may take the form of a method that involves (i) receiving first data of one or more geographical environments from a first type of localization sensor, (ii) receiving second data of the one or more geographical environments from a second type of localization sensor, (iii) determining constraints from the first data and the second data, (iv) determining shared pose data associated with both of the first data and the second data using the constraints determined from both the first data and the second data by determining one or more sequences of common poses between respective poses generated from each of the first and second data, wherein the shared pose data provides a common coordinate frame for the first data and the second data, and (v) generating a map of the one or more geographical environments using the determined shared pose data.

In example embodiments, generating the map of the one or more geographical environments may comprise (a) generating a first map of the one or more geographical environments suitable for use with the first type of localization sensor, wherein the first map uses the common coordinate frame and (b) generating a second map of the one or more geographical environments suitable for use with the second type of localization sensor, wherein the second map uses the common coordinate frame. Further, in such example embodiments, generating the first map of the one or more geographical environments may output the generated first map as a first map layer, and generating the second map of the one or more geographical environments may output the generated second map as a second map layer. Further yet, in such example embodiments, each of the first map and the second map may comprise a three-dimensional representation of the geographical environments used to localize one or more sensors.

In other example embodiments, generating the map of the one or more geographical environments may comprise determining one or more sequences of common poses between respective poses generated from each of the first and second data based on the first data, the second data, and the determined constraints from both the first data and second data.

In still other example embodiments, generating the map of the one or more geographical environments may comprise (a) performing one or more map structure generation methods (e.g., a simultaneous localization and mapping method) using one or both of the first data or the second data to generate a first approximate map of the one or more geographical environments and (b) refining the first approximate map by identifying one or more points along trajectories that are the same position within the environment to output the refined first map. In such embodiments, generating the map of the one or more geographical environments may also further comprise (c) performing feature detection to identify one or more features of the one or more geographical environment, (d) generating a second approximate map of the one or more geographical environments using the one or more features of the one or more geographical environments, and (e) refining the second approximate map using one or more further map structure generation methods (e.g., comprises a structure from motion method) to output the refined second map.

Further, in such embodiments, determining the shared pose data may comprise (a) generating a pose graph based on the refined first approximate map and the refined second approximate map, wherein the constraints determined from both the first data and the second data are determined from the refined first approximate map and the refined second approximate map, and (b) optimizing the pose graph based on the refined first approximate map and the refined second approximate map to determine the shared pose data by determining one or more sequences of common poses between respective poses generated from each of the first and second data, wherein the shared pose data provides a common coordinate frame for the first data and the second data.

In example embodiments, the first data and second data may be correlated using temporal data to determine one or more relationships between the first and second types of localization sensors, and the output from the first type of localization sensor and second type of localization sensor may also be synchronized.

Additionally, in example embodiments, each of the first and second types of localization sensors may comprise one or more of: a Light Detection and Ranging (LiDAR) sensor, a Radio Detection and Ranging (Radar) sensor, a Sound Navigation and Ranging (Sonar) sensor, an Inertial Navigation System, a Global Positioning System, an Inertial Measurement Unit, or an image sensor, and each of the first and second data may comprise any one or more of: depth information; point cloud data; or image data.

In a further aspect, the disclosed technology may take the form of a computing system comprising at least one processor, a non-transitory computer-readable medium, and program instructions stored on the non-transitory computer-readable medium that are executable by the at least one processor such that the computing system is configured to carry out one or more functions of one or more of the aforementioned methods.

In yet another aspect, the disclosed technology may take the form of a non-transitory computer-readable medium comprising program instructions stored thereon that are executable to cause a computing system to carry out one or more functions of one or more of the aforementioned methods.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF DRAWINGS

Embodiments will now be described, by way of example only and with reference to the accompanying drawings having like-reference numerals, in which.

Figure 1:
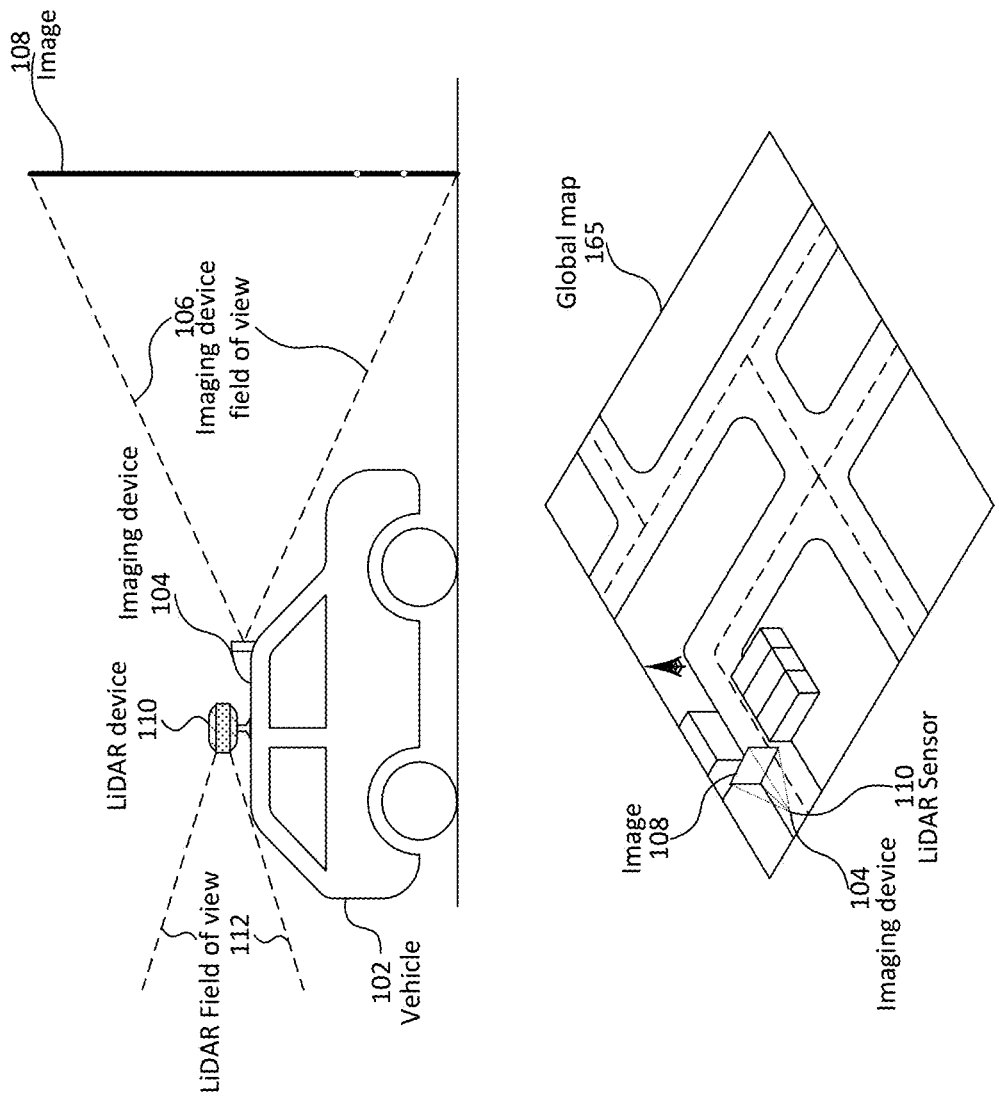
FIG. 1 illustrates an example vehicle that can capture visual data and LiDAR data as it traverses an environment, showing the field of view of the visual data captured and the LiDAR scatter field on a perspective view of a geographical area.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Referring to FIGS. 1 to 9, example embodiments relating to a method of generating a map using at least two sources of sensor data will now be described. Aspects and/or embodiments seek to provide a method of combining multiple types of sensor data to generate map data that can be used to localize vehicles equipped with any of the types of sensors from which data was sourced for the map.

For real-world map generation, various map generation techniques and map generation pipelines can be implemented. In order to create a map of high quality, vehicles may be equipped with multiple sensor devices that are configured to capture high quality and granular information about the environment. Maps can be built using data captured by these vehicles, which may be equipped with camera (s), Light Detection and Ranging (LiDAR) sensors and/or other types of sensors capable of capturing sensor data representing geographical areas that can be used to build a map and/or localize within a map. These sensors may be referred to herein at times as "localization sensors."

A problem with existing map generation techniques that use a single type of localization sensor to build or generate map data is that such maps can only be used to localize the same type of localization sensor that has been used to capture the map's source data. So, for example, maps generated with LiDAR sensor data can only be used to localize devices with a LiDAR sensor while maps generated with image sensor data can only be used to localize devices with image sensors. Simply mapping with two types of localization sensors does not immediately improve the situation as, if for example a device is localized using a LiDAR-generated map there is typically no accurate and reliable approach to determine how that localization estimate translates exactly to a map of the same environment generated with image sensor data and vice versa, so mapping with two types of sensor systems typically creates two independent maps that are not readily interchangeable.

Example embodiments seek to describe a method of generating a map using at least two independent localization sensors. More specifically, example embodiments will be described to generate a unified or combined map using, by way of example, LIDAR data and visual data (e.g., image data), obtained from vehicles. The purpose of such an example combined LiDAR and visual map is to provide a map that allows localization of vehicles using either a LiDAR sensor (i.e., a first type of localization sensor) or an imaging sensor (i.e., a second type of localization sensor), or a plurality or a combination of these localization sensors. In order to achieve this, the example LiDAR and visual map requires alignment to a consistent global coordinate frame. Having a consistent global coordinate frame, to which the LiDAR and visual maps are aligned, can allow the determination of an accuracy factor between a lower quality map and a higher quality map, or between sensors.

FIG. 1 shows two perspective views, a side view and an angled view, of how vehicles, such as an example vehicle 102, can be used to obtain data for map generation. A map generated from visual data (e.g., image data from image sensors such as cameras) can for example include datasets of trajectory data (e.g., image poses) and structural data derived from the visual data. Similarly, a map generated from LiDAR data can for example include datasets of LiDAR point clouds and trajectory data derived from the LIDAR data. FIG. 1 illustrates an example vehicle 102 that can simultaneously capture various sensor data that can be used to align derived map data to a common coordinate frame for combined map generation according to at least some of the example embodiments herein. Although FIG. 1 illustrates a single vehicle 102 with both an image sensor 104 and LiDAR equipment 110, the combined map as global map 165, or substantial portion of the combined map, generated by way of example embodiments can be generated using vehicles with image sensors (but not LiDAR equipment) or vehicles with LiDAR equipment (but not image sensors), or a combination of such vehicles in a fleet of vehicles. In example embodiments, the global map 165 is not associated with a particular reference device, vehicle, sensor or collect, but instead is a global reference with a variety of collects, samples, sensor input data, map types or map segments from a plurality and/or variety of devices, vehicles, robots or sensors obtained at different times, places and environmental conditions which may be continuously updated.

FIG. 1 illustrates a vehicle 102 for obtaining image data for map generation. More specifically, FIG. 1 depicts a vehicle 102 comprising an imaging device 104 mounted upon it to capture images 108. The imaging device 104 may be attached to the vehicle 102 externally, such as on the roof of the vehicle 102 at an appropriate elevated height above the ground to capture scenes observed (thus containing fewer obstacles obscuring any visual information such as structures, landmarks or road markings as a result of this elevation). Although the imaging device 104 is positioned on top of the vehicle 102 in FIG. 1, the imaging device 104, or multiple imaging devices, may alternatively be placed inside the vehicle 102 or mounted elsewhere on the vehicle 102 on any suitable locations in or on the vehicle 102. Example locations for sensors may include the front and rear bumpers, the doors, the front windshield, on the side panel, or any other suitable position from which the surrounding environment can be observed. Each vehicle 102 can be provided with multiple imaging devices 104 and multiple LiDAR sensors 110 attached to it such that the plurality of sensors can work together to capture 360-degrees (in one plane) of data from both sensor types of the surroundings along a trajectory of the vehicle 102. The field of view 106 of the imaging device 104, otherwise known as the angle of view, can vary depending on the placement of the imaging device 104 on (or in) the vehicle 102. Similarly, the field of view 112 of the LiDAR device 110 can vary depending on the placement of the LiDAR device 110 on (or in) the vehicle 102.

As different types of localization sensors obtain independent data about an environment to be mapped, independent maps can be generated for each of the sensor data.

Figure 2:
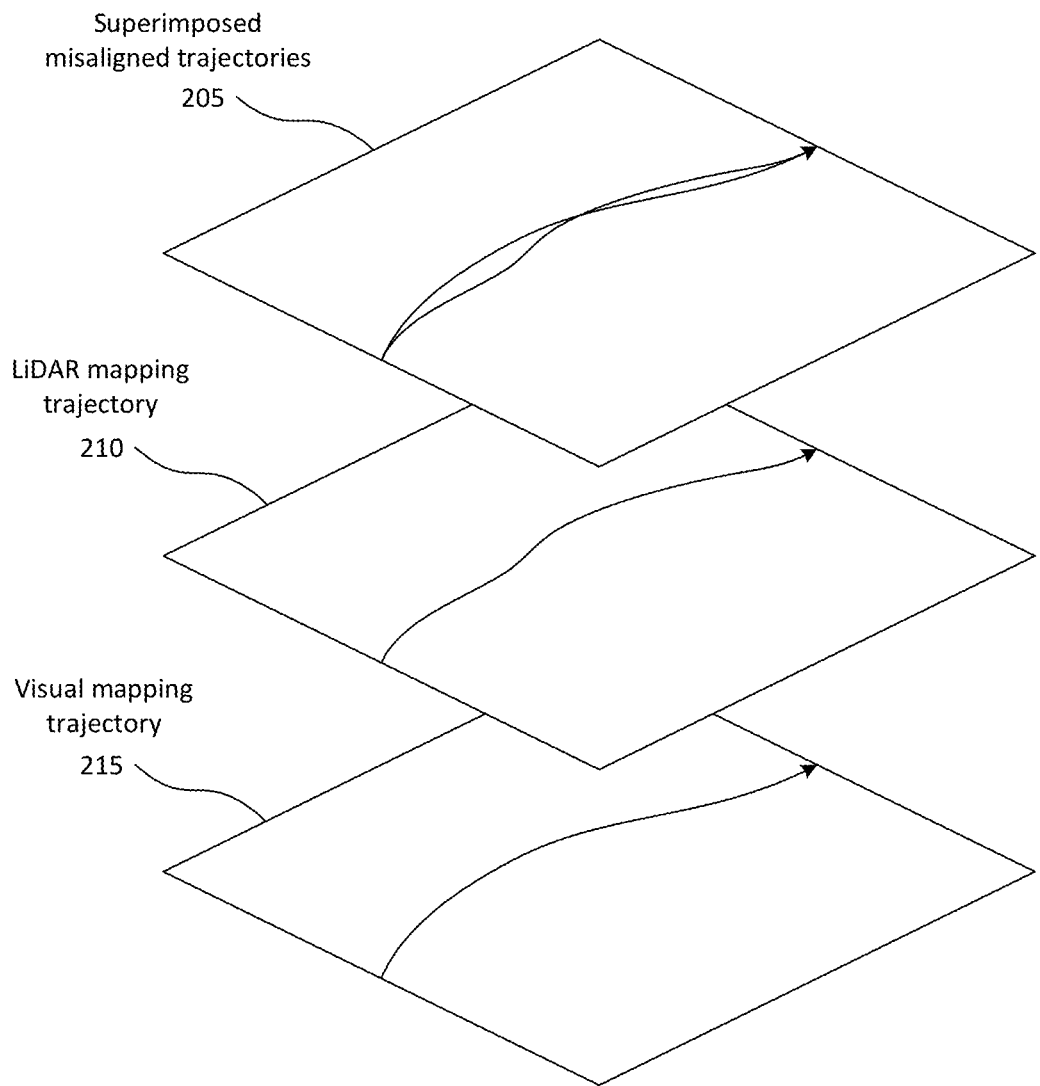
FIG. 2 illustrates one example of a misalignment between trajectory data determined from two different types of collects when overlaid on top of each other in a common coordinate frame.

FIG. 2 illustrates some example determined trajectories demonstrating a misalignment between LiDAR and visual mapping trajectory data, 210, 215, with respect to the local or independent coordinate frames of the respective LiDAR map and visual map. If the determined trajectories according to both LiDAR and visual maps are superimposed 205, an accumulation of errors within their independent coordinate frames results in the apparent misalignment of the LiDAR and visual trajectories 210 and 215 in spite of the data being gathered by a vehicle travelling along one trajectory. For example, overestimation and underestimation of movement through the environment based on the data obtained from the individual localization sensors and within the separate LiDAR and visual maps can result in an accumulation of minor errors. Such inaccurate estimations can be detrimental for applications such as autonomous navigation, for example, that can require accuracy to the centimeter level to be able to function effectively.

For combined LiDAR and visual map generation, it may also be possible to align both LiDAR and visual maps to the same global positioning system (GPS) coordinate system. However, a simple translation of data cannot be made between the coordinate frames of the LiDAR and visual maps to the global GPS coordinate system even for vehicles employing both LiDAR and visual sensors. The level of precision expected to be required cannot seemingly be achieved with current GPS technologies for various reasons, including for example due to the changing environmental conditions experienced in at least some if not most locations, such as atmospheric effects, the reflection of waves in urban environments, and sky visibility.

Figure 3:
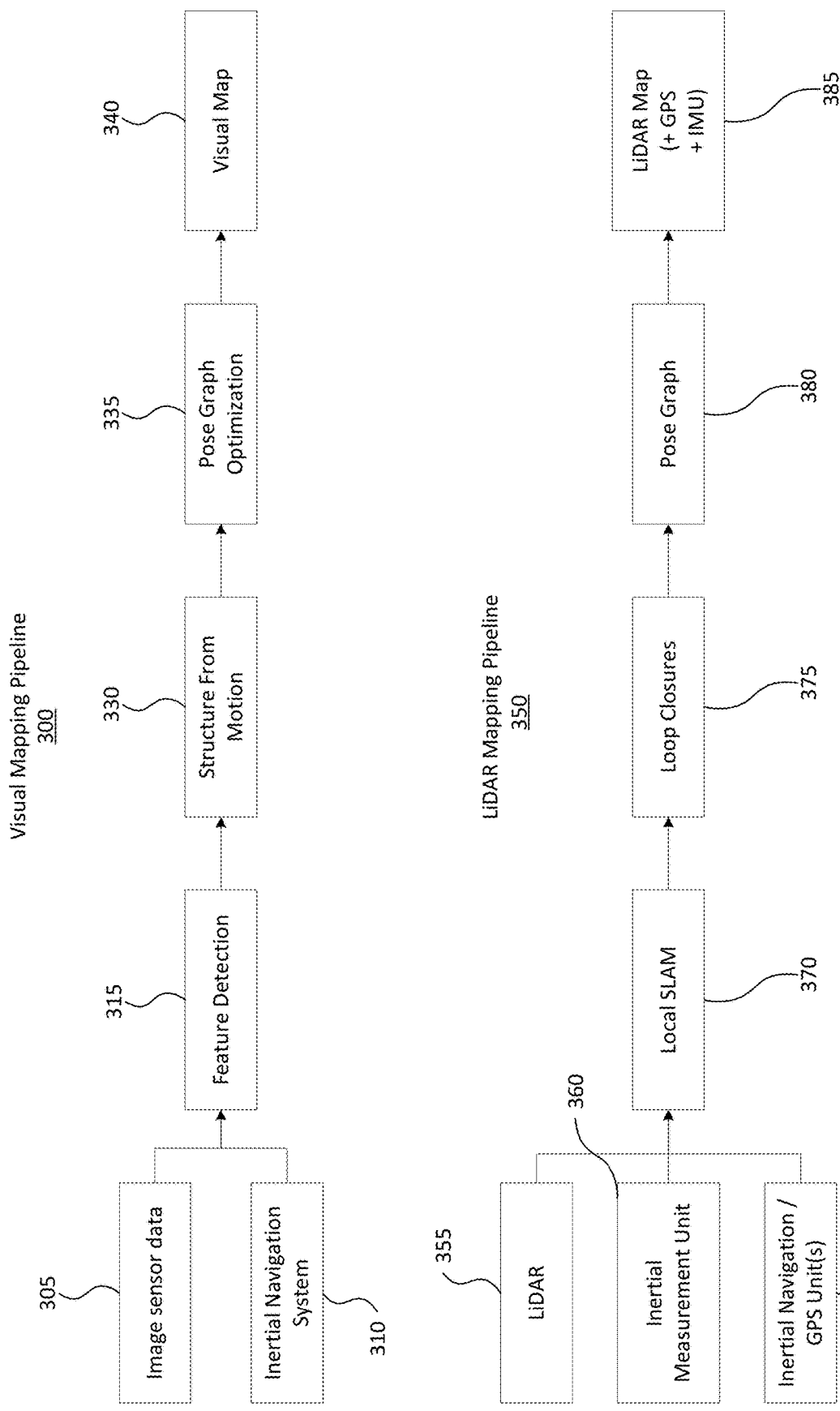
FIG. 3 shows an overview of a typical process for visual mapping and similarly an overview of a typical process for LiDAR mapping.

FIG. 3 shows a flow chart illustrating a LiDAR mapping pipeline 350 for creating and/or updating a LiDAR map 385 and a corresponding flow chart detailing a visual mapping pipeline 300 for creating and/or updating a map 340 generated using visual data.

In example embodiments, LiDAR map generation requires LiDAR sensor based inputs. Inputs may include LiDAR point cloud data 355, inertial measurement unit (IMU) data 360 and GPS data 365. In example embodiments, the vehicle 102 can have a LiDAR sensor array of one or multiple LiDAR sensors 110 that are configured to emit pulsed laser light and measure the reflected light from objects surrounding vehicle to obtain point cloud data. In example embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibres, which may be arranged such that the light beam may be directed to many discrete positions around the vehicle. In some embodiments, a vehicle may obtain and process other sensor data. Such data may be captured by any other suitable sensor.

In example embodiments, a localization technique such as simultaneous localization and mapping (SLAM) 370 can be applied to the sensor data that are input as part of the LiDAR mapping pipeline 350. Such techniques may not be sufficiently robust for large scale use, however implementations of SLAM can be designed for a certain set of environmental conditions and within a certain map sizes to avoid requiring a large amount of storage and processing power.

In example embodiments, for the LiDAR mapping pipeline 350, as vehicles traverse local areas point clouds are obtained. Several point clouds can be aggregated into submaps using a loop closure technique, for example a learned loop closure detector. Loop closures 375 can be used to determine the trajectory of the vehicle within LiDAR submaps. In some embodiments, the loop closures 375 can be determined within constraints based on the amount of memory storage available to store LiDAR submaps.

Each LiDAR submap can have its own local coordinate system and thus may not align accurately to generate a global LiDAR map due to the constraints between neighboring and nearby LiDAR submaps and constraints within each of the LiDAR submaps, which may not be easily reconciled with each other. The LiDAR submaps can therefore be fused together based on the loop closures 375 using pose graph optimization 380. In example embodiments, pose graph optimization 380 of the LiDAR submaps can transform local coordinates of each of the LiDAR submaps into coordinates of a global LiDAR map 385. LiDAR submaps can thus be localized with respect to the global LiDAR map 385 for example. Pose graph optimization 380 can optimize LiDAR submaps based on the local and global constraints. Furthermore, pose graph optimization 380 can take into account the LiDAR submaps to compute a global trajectory of the vehicle (e.g., a sequence of poses) within the LiDAR map 385 according to the findings of the sensor data 355, 360, 365 and loop closures 375. In some embodiments, submaps may be considered to be a local coordinate system and this local coordinate system is mapped to a global coordinate system (e.g., on a global map). Each submap may include data such as where the vehicle (or each of the vehicles used to obtain data for the submap) was during a particular trajectory (e.g., where the vehicle was at every point in time). This data introduces constraints between submaps and a global map, or even between two or more submaps. Some embodiments include vehicle trajectory to submap constraints, and these are addressed determining whether a vehicle has obtained sensor data in the same location/position before. This can be performed using loop closures (for LiDAR derived maps) or SfM techniques (for image sensor derived maps).

Similarly, in example embodiments, visual map generation requires visual sensor-based inputs. Inputs may include image data 305 and/or inertial navigation system (INS) data 310 (e.g., GPS data). Various types of imaging sensors 104 can be used to capture image data 305. For example, with the use of camera rigs such methods can obtain 360-degree coverage of geographical areas and can also result in accurate and robust quality map generation, although the expensive system required for data collection and the time required to process the data gathered may limit scalability. Using visual data such as from an image camera; a video camera; a monocular camera; a depth camera; a stereo image camera; and/or a high dynamic range camera, can allow localization of the vehicle 102 within the visual map 340 based on known visual data.

In some embodiments, the visual data may be acquired by single-viewpoint or limited field of view (intended to be understood as having a field of view of less than 360-degrees in one plane) cameras such as those in a typical "smartphone", i.e. a mobile telephony device equipped with image sensors, or any other data-enabled mobile device with a limited field of view image sensor. Using such devices to obtain image data for map generation can reduce the costs of visual mapping of the real world with the use of off the shelf hardware that is relatively readily available. As these devices are plentiful, and can be cheap to procure and easy to deploy, they can provide a scalable aspect of a map generation system or pipeline. Alternatively, however, the imaging device 104 may be any form of limited field of view image sensor capable of capturing and communicating image data to a map generation system for the image data to be processed. In some embodiments, a vehicle 102 may obtain and process other sensor data. Such data may be captured by any other suitable sensor.

In example embodiments, feature detection 315 and other techniques to group the sensor data into visual submaps can be used. Each visual submap can have its own local coordinate system and thus may not align accurately to generate a global visual map due to the constraints between visual submaps and constraints within each of the submaps which may not be easily reconciled with each other. The visual submaps can therefore be fused together using Structure from Motion (SfM) techniques 330 and pose graph optimization 335. In example embodiments, pose graph optimization 335 of the submaps can transform local coordinates of each of the visual submaps into global coordinates of the independent global visual map 340. Visual submaps can thus be aligned within the global visual map 340 for example. Pose graph optimization 335 can optimize the combined visual submaps based on the local and global constraints. Furthermore, pose graph optimization 335 can take into account the visual submaps to compute a global trajectory of the vehicle (e.g., a sequence of poses) within the visual map 340 according to the findings of the sensor data 305 and 310 and SfM 330.

In example embodiments, to be able to localize on the geometric map with either LiDAR or imaging sensors such as cameras, the combined map must include both LiDAR and visual information aligned to a common coordinate frame in at least a substantial portion of the combined map in order to able to transform data into the global coordinate frame of the combined map. This can be done in the example embodiments by registering the two maps against each other by determining a common pose graph comprising constraints from the pose graph optimisation of both LiDAR and visual map data. Furthermore, in example embodiments, the use of a combined LiDAR and visual mapping pipeline can lead to a tighter coupling between the otherwise two independent maps which can result in higher accuracy for localization of vehicles employing either LiDAR or imaging sensors.

A visual map 340 built from images can only localize vehicles that employ imaging sensors and likewise with LiDAR maps 385 for vehicles that only use LiDAR sensors. However, it may be desired to localize vehicles across the different formats (e.g. LiDAR and visual) of maps.

Figure 4:
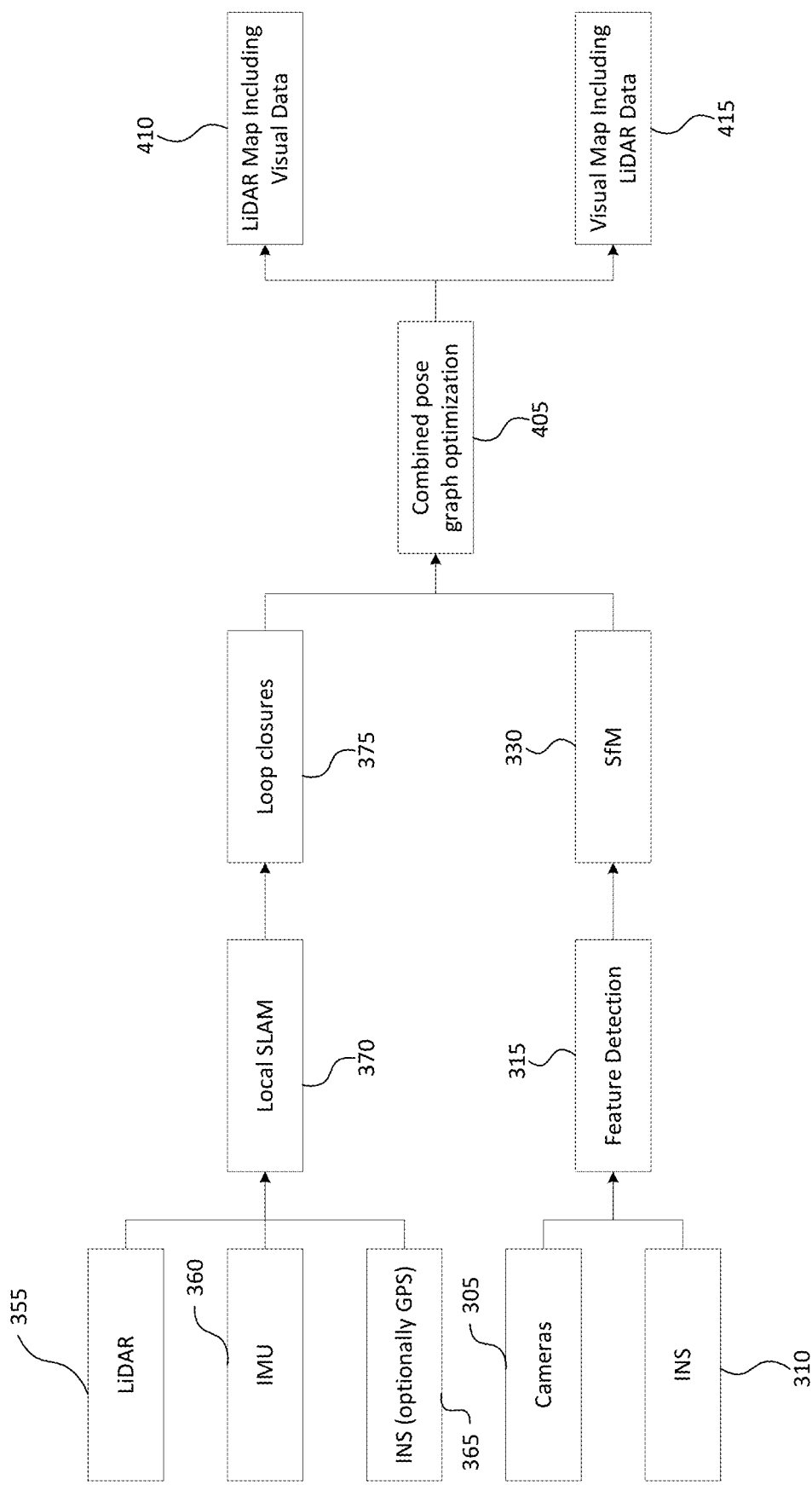
FIG. 4 illustrates a shared pose graph generation pipeline according to an example embodiment.

FIG. 4 shows a flow chart of an example embodiment detailing a shared pose graph generation pipeline for creating and/or updating a map using a combination of LiDAR and visual data. In the example embodiment, both the LiDAR map 385 (generated using at least a LiDAR sensor as a first type of localization sensor) and visual map 340 (generated using at least an image sensor as a second type of localization sensor) are correlated with each other by determining a combined coordinate frame or a global coordinate frame between the LiDAR and the visual mapping pipelines 350 and 300 by determining a common reference frame between the two independently generated maps 385 and 340. Example embodiments using this approach can thus result in more accurate localization across sensor data and across maps, as a vehicle equipped with either type of localization sensor can access a map generated from both types of localization sensors.

As shown in FIG. 4, both pipelines use pose graph optimization. In the example embodiment, a combined pose graph optimization 405 is implemented. Specifically, by merging the constraints that would normally be input into the individual pose graph optimizations of the individual pipelines (for example, as shown in FIG. 3) in one combined pose graph optimization process 405, then pose graph optimization can be performed in one optimization process and output aligned maps for both pipelines. In some embodiments, there may be constraints related to the visual data and a separate set of constraints related to the LiDAR data. As an example, according to visual constraints, a particular pose of a vehicle may be 3 meters apart from a sequential pose. However, according to LiDAR constraints, the same distance may be considered to be 2.9 meters apart. Thus, these sets of constraints can be optimized to minimize the overall error between the set of constraints. In some embodiments, the optimization process may include adjusting the overall trajectory of either data source to minimize the difference between the constraints. In some embodiments, the constraints relate the relative poses between the different positions of the vehicle at different times over the vehicle's trajectory. In some embodiments, the constraints can refer to rotation and translation constraints.

Thus, the described embodiment merges the previously independent pipelines of map generation using LiDAR and map generation using visual data by performing a combined pose graph optimization 405 across both data types. Furthermore, in example embodiments, in generating a global combined map, a LiDAR map 410 built using both LiDAR and visual data and a visual map 415 built using both visual and LiDAR data can be generated. In this way, the maps are both correlated to the same coordinate frame, the maps built using data from both types of localization sensors thus can improve accuracy and/or utility with each sensor type when localizing from the generated maps and the quality of the combined global map can be improved compared to the individual LiDAR and visual maps.

In example embodiments, visual data (e.g., image data) and LiDAR data are collected simultaneously for at least a portion of the combined map with some overlap with the visual data and the LiDAR data in order to enable alignment of the two types of data together robustly. Furthermore, using additional data during optimization or creation of map data, such as timestamp, GPS, or IMU data, the combined map as well as individual maps can be further optimized for localization of devices and/or vehicles. For example, by obtaining timestamp data, data from different sources can be compared in order to estimate and/or determine the position of the device or vehicle with more accuracy. Timestamp data can be provided by storing for example GPS data. Also, using inertial measurement or IMU data can allow a device to estimate its location based on detected movement relative to one or more previous known locations. Using data from a satellite positioning system such as GPS helps to narrow the location search, as this data can be assumed to be roughly accurate.

In example embodiments, the submaps generated from data provided into the individual mapping pipelines and the raw respective sensor data can be considered together and optimized together during pose graph optimization. The objective of pose graph optimization is to estimate vehicle trajectories (essentially a collection of poses) from relative pose measurements. In example embodiments, the combined data pose graph can depict the various constraints that need to be considered when optimizing the poses in order to generate a single trajectory from the LiDAR data and the visual data. In some embodiments, the combination of the two sets of constraints and their data provides a single trajectory that is common for both types of input data.

Pose graph optimization applies an iterative optimization technique until there is a substantial convergence in the data to a single trajectory from the LiDAR and visual data. The trajectory can be estimated accurately using a weighted sum of the residual errors from both mapping pipelines. The pose graph optimization can be used to determine how each of the LiDAR and visual submaps relate to the combined global map and how they relate to each other. In this way, the pose of the vehicle at every point in time can be determined, eventually being able to form the vehicle's trajectory within the global map.

When performing map structure generation, one or more initial approximate maps are generated of the geographical environments in the form of an approximate map (or submaps) output using local SLAM 370 for the LiDAR data 355 gathered of the geographical environments; and an approximate map output using feature detection 315 for the image data output from the cameras 305. A process of refining the initial approximate maps is then performed using loop closures 375 or SfM 330 respectively, in order to output respective refined maps. The refinement processes broadly aim to match up trajectories taken through the environment (i.e. identifying one or more common points in the data along the trajectories of the LiDAR 355 using loop closures 375 and the cameras 305 using Structure from Motion techniques 330).

Figure 5:
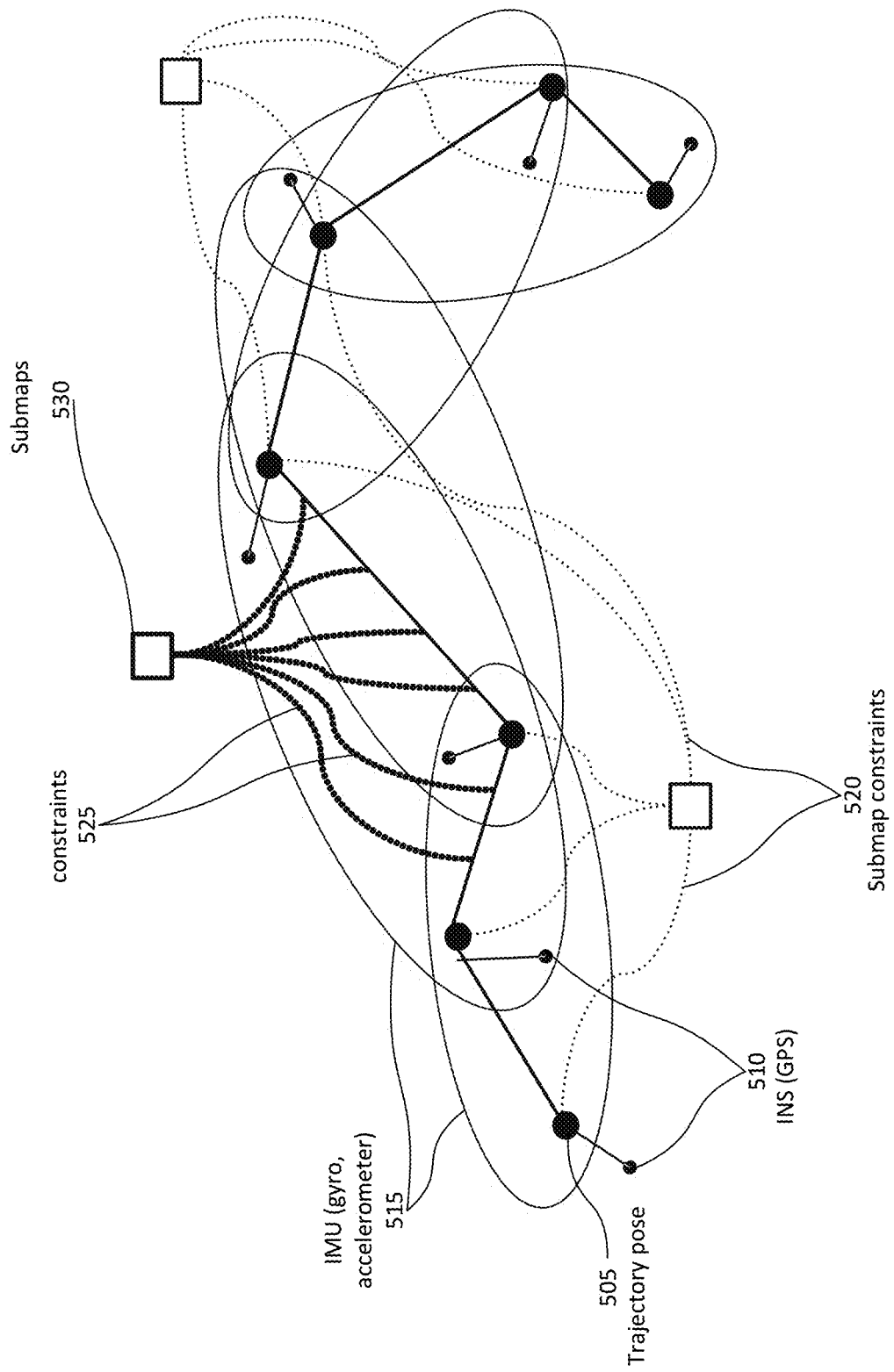
FIG. 5 shows relationships between visual mapping data and LiDAR data samples in a shared pose graph including a representation of the constraints, trajectories, and additional sensor data used in generating an example shared pose graph.

Turning now to FIG. 5, in example embodiments, relative pose measurements can be obtained from a variety of sensor data such as IMU 515, GPS data 510, and/or visual and LiDAR data (not shown in FIG. 5). FIG. 5 illustrates the relationships between visual mapping data and LiDAR data samples in a shared pose graph, including a representation of the passage of a vehicle (e.g. the trajectory pose(s) 505) through time, the submaps 530 (submaps being portions of the whole maps, containing data from LiDAR data and/or visual sensors), the associated inter-submap constraints 520 and intra-submap constraints 525, as well as any constraints, trajectories and additional sensor data (e.g. IMU, gyroscope and/or accelerometer data 515) used in generating the combined pose graph. In some embodiments, when the submaps are generated using (primarily) LiDAR sensor data the constraints may relate to LiDAR constraints, or throughout the LiDAR mapping pipeline 350. Similarly, when the submaps are generated using visual data obtained by one or more image sensors the constraints may relate to any constraints of the visual map pipeline 300.

In example embodiments, optimizing across the constraints from both LiDAR and visual mapping pipelines can thus lead to a tighter coupling between the LiDAR and visual data of the two mapping pipelines, which can result in higher accuracy than parallel pipelines.

For illustration purposes, only single trajectories are shown in the representation of FIG. 5, however, it is to be acknowledged that the same vehicle or other vehicles may traverse along the same or similar path to obtain overlapping data collects for trajectories. In some embodiments, for vehicles obtaining image data from substantially the same location to show overlapping trajectories, there can be differences in the orientation of the images obtained and the timestamps of when each image was obtained for example, which means the scene observed by the two vehicles may differ substantially. For example, the image data may be collected having two contrasting environmental conditions. By collecting data across a variety of times of data and weather conditions of overlapping data, it can be possible to assess visual and structural similarities across these contrasting conditions.

Figure 6:
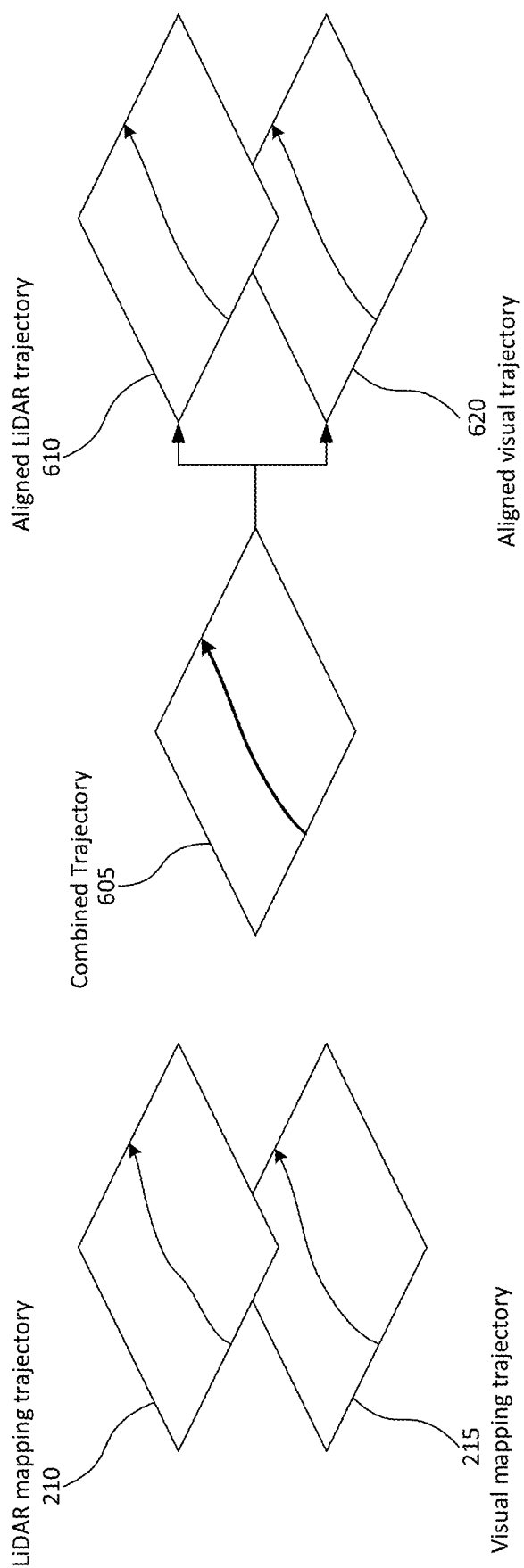
FIG. 6 illustrates an example process of combining a generated visual mapping trajectory and a generated LiDAR trajectory having determined an aligned trajectory from a combined pose graph optimization process, allowing determination of separate aligned trajectories for LiDAR maps and visual maps that are derived from the aligned trajectory.

FIG. 6 shows a visual representation of a combined trajectory 605 that results from the combined pose graph optimization 405. Effectively, the trajectory data is generated from the two datasets once the combined pose graph optimisation has been performed using both sets of input data, rather than generating a LiDAR mapping trajectory 210 and a visual mapping trajectory 215 independently using two separate mapping pipelines for each data type. As a result, the two output sets of trajectory data, i.e. the aligned LiDAR trajectory data 610 and the aligned visual trajectory data 620, are aligned as they are both generated from a single combined trajectory 605 derived from the combined set of constraints resulting from the optimization performed during the pose graph optimization 405. The combined trajectory 605 can be used to create separate LiDAR and visual trajectories 610 and 620 and/or maps that are aligned to a common coordinate frame of the combined map.

Figure 7:
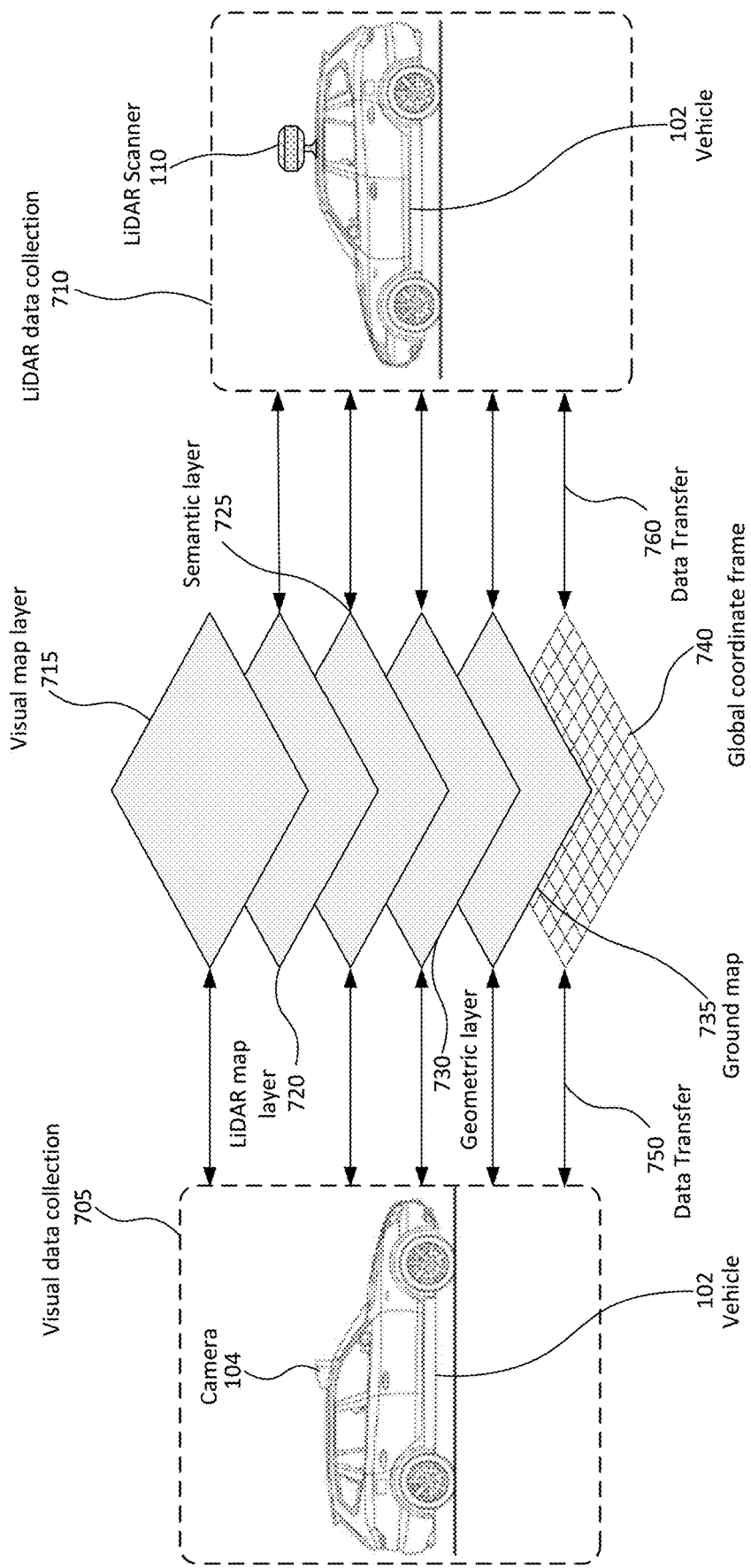
FIG. 7 illustrates an example of various map layers that are correlated to one global coordinate frame, and the contribution of aligned visual mapping data and aligned LiDAR mapping data as layers of the map.

FIG. 7 shows a utilization of aligned map layers that illustrates that the visual data 705 and the LiDAR data 710 and their respective map layers 715, 720 can be stored as several layers of the combined global map, along with other layers such as a ground map 735, a geometric map layer 730, a semantic map layer 725, and all layers aligned to one global coordinate frame 740. The data in the layers can be accessed 750, 760 from the vehicles 102, but it is shown in the FIG. that the data accessed by a vehicle 102 having only a LiDAR type of localization sensor 110 will not include the visual map layer 715 while the data accessed by a vehicle 102 only having a camera type of localization sensor 104 will not include the LiDAR map layer 720 for example, as these layers of the map will not be able to be utilised by a vehicle 102 lacking the respective type of localization sensor for that map layer. In some embodiments, generated data such as a ground map derived from LIDAR data can thus be used together with the visual layer of the map for example.

Figure 8:
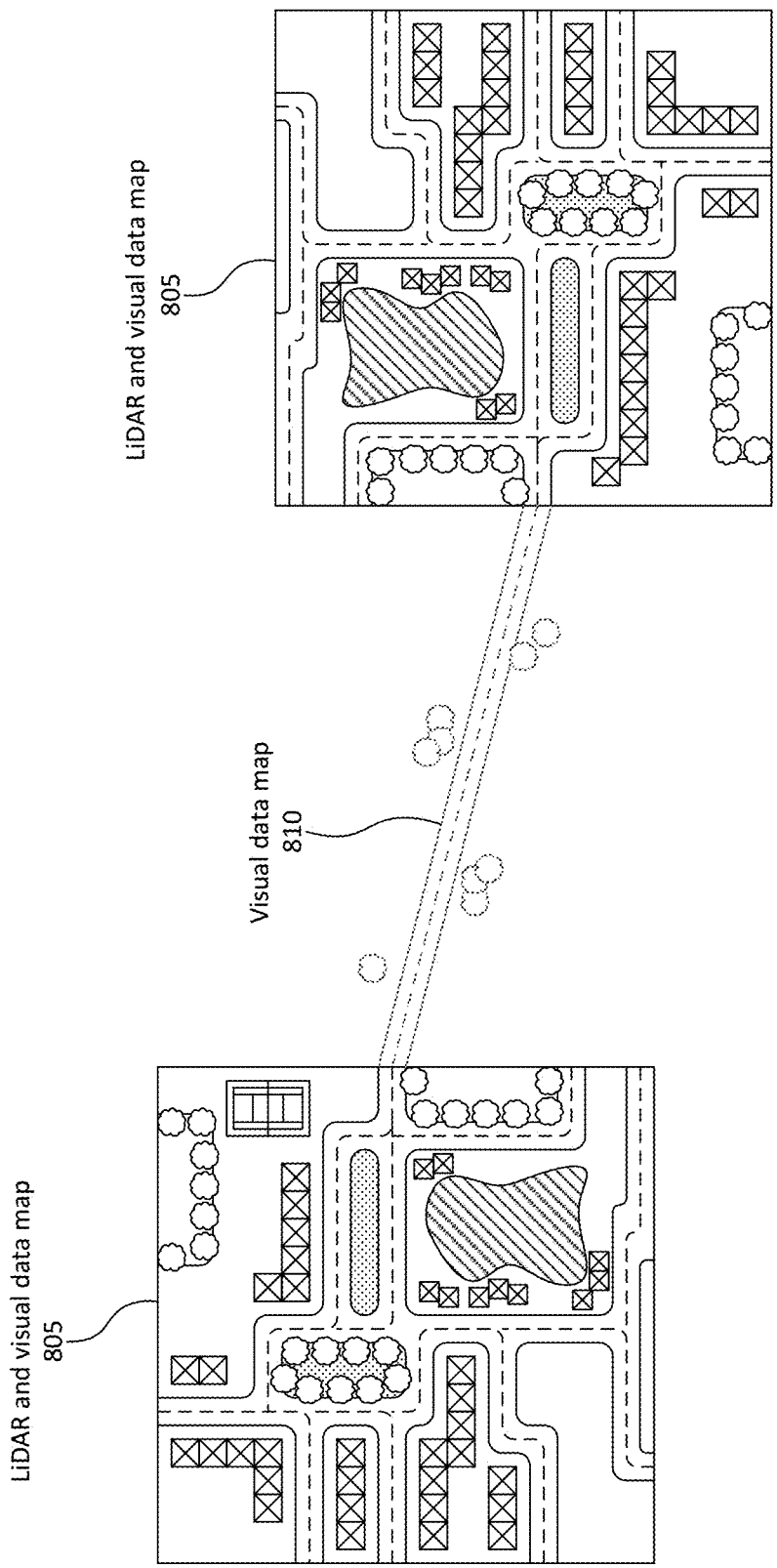
FIG. 8 shows an embodiment where a hybrid localization map is generated as a result of some parts of the geographical area having both visual mapping data and LiDAR mapping data, while another part having only visual mapping data.

FIG. 8 shows an illustration detailing an example of how the relationships between LiDAR and visual data when aligned to a common coordinate system can be used, and how they can be combined to form an amalgamated map or a hybrid map. More specifically, FIG. 8 illustrates two sections of LiDAR and visual data combined maps 805, showing a representation of built up areas, and a visual-only map 810 linking the two combined maps 805. In this example, the combined maps 805 are higher quality than the visual-only map 810 but as the link between the two built up areas shown in the combined maps 805 is a single road, for which a higher quality map may not be required, and thus only a visual data map 810 has been generated in this example. Therefore, the linking map 810 for the road section relies on visual data only, and is of "lower" quality only because it lacks a LiDAR layer within the global map (and may or may not actually be of lower quality than a LiDAR only map or combined LiDAR/visual data map). However, as the LiDAR and visual maps 805 are combined to form a substantial area of the combined global map, the visual map data 810 can be well aligned with the coordinates of combined areas 805.

In some embodiments, vehicles having both/all types of localization sensors for which there are map layers available (e.g. LiDAR and visual sensors, and any other localization sensors) can compare one or more of the map layers to assess the quality of each of the map layers for localization purposes.

In some embodiments, it may be possible to update the combined map using only visual or only LiDAR data. The global map or global master map can be updated with new or updated information gathered by the sensors of the client device(s).

In some embodiments, an odometry system can be implemented which can use the inputs from the sensors on vehicles to estimate the location of the vehicle, and can use the relative position differences determined from successive data from the sensors to determine relative movement of the vehicle with respect to the global combined map and therefore movement in the local frame of reference of the vehicle in order to estimate the pose of the device. The method can work to provide localization in a number of different dimensions, including in two- and three-dimensions (but also in other numbers of dimensions, including for example one-dimension).

A property of odometry is that it typically accumulates an error over time if based purely on local sensor data and estimates—a problem known as "drift." Optionally, to mitigate this effect, odometry can be extended to a SLAM-based system utilizing loop closure and graph optimisation procedures. Implementations of such systems can depend on the type of sensor used, such as, for example monocular or stereo camera, depth camera, or laser sensors.

A server system can store a large amount of map data in a global master map in order to provide relevant localization data from the global master map data to devices when requested to do so. Optionally, one or more sets of local map data and/or one or more sets of global map data can be stored within the global master map data.

In some embodiments, the LiDAR and visual mapping pipelines may be implemented by one or more computing systems or servers. In some embodiments, a vehicle may be equipped with an array of sensors and a navigation system.

The vehicle can be autonomous, semi-autonomous, or manually drivable. As an example, and not by way of limitation, the network environment may include multiple vehicles, third-party systems, and networks. The fleet of vehicles, in whole or in part, may be owned by the entity associated with the transportation management system, or they may be owned by a third-party entity relative to the transportation management system. In either case, the transportation management system may control the operations of the vehicles. In some embodiments, some or all modules of the pose graph optimisation may be implemented by one or more computing systems locally on the vehicles.

Conditions change constantly, even for the same paths taken by multiple vehicles. For example, a vehicle obtaining image data may be following a larger vehicle that is blocking its view. In such scenarios, the imaging device may not be able to obtain image data to be used to reconstruct a robust map due to the occlusion. Thus, in order to overcome such situations, in some embodiments a sparse matching algorithm may be used to filter out such image data thus only retain substantially reliable image data.

Operations may be run in order of ascending computational complexity, such that computationally cheaper operations can be performed first, in order to avoid unnecessary intense computation. Furthermore, many variations to the example embodiments are possible. It should be appreciated that there can be additional, fewer, or alternative steps performed in similar or alternative orders, or in parallel, within the scope of the various embodiments discussed herein unless otherwise stated.

It is particularly important for scalable methods to be available to process image data and generate maps, such as for maps deployed in the cloud used for visual localization (and for developments of further applications such as trajectory simulations for autonomous vehicles, urban planning, and augmented reality for example).

Image data obtained for processing by at least one image sensor attached to each of the transportation vehicles, in example embodiments, may be in the form of a raw image file in order to save, with minimum loss of information, data obtained from the sensor, and the conditions surrounding the capturing of the image, i.e. metadata. In example embodiments, in order to convert image metadata into a photographic rendering of a scene, and then store them as a standard graphical format, processing may be carried out locally within the image sensor, or in a raw-file converter, or by using a remote method. Typically, processing image data may include, but not limited to, decoding, defective pixel removal, noise reduction, compression, optical correction, or dynamic range compression. Optionally, further features or "metadata" that can be used for associating image data for map generation include, however is not limited to, GPS data, IMU data, environmental data, semantic data and timestamp measurements. Building the sets of image data can take into account some or all of this metadata or that metadata which is available for the images.

In particular embodiments, the imaging device may include one or more processors (e.g., CPU, GPU), memory, and storage. An operating system and applications may be installed on the user device, such as, e.g., a map-based application associated with various modules as disclosed herein, applications associated with third-party systems, and applications associated with the operating system. The imaging device may include functionality for determining its location, direction, or orientation, based on integrated sensors such as GPS, compass, gyroscope, or accelerometer. The device may also include wireless transceivers for wireless communication and may support wireless communication protocols such as Bluetooth, near-field communication (NFC), infrared (IR) communication, and WI-FI. The device may also include one or more cameras, scanners, touch-screens, microphones, speakers, and any other suitable input-output devices.

Sequential image data may be further defined as a sequence of image frames, captured over a period of time as a vehicle moves within an environment. In example embodiments, sequential image data may further be defined as an orderly set of image frames, ordered by image frames with respect to time, location, and/or enlargement or diminution of a particular scene or part of a scene observed by the imaging device. In some embodiments, each image frame may also be provided to the system with its corresponding location data for example GPS coordinates of an image frame or a group of image frames which may be used to group image data together. Sequential image data is typically segmented into approximately thirty frames per subset of image data; however, embodiments described herein may be capable of processing varying sizes of image data subsets and it can also be possible to process a varying number of image frames. Thirty image frames can be seen as an example subset size as typical paths of vehicles can be misunderstood if subset sizes are too small and may lead to confusion or duplication in categorising subsets as straight or turns if subset sizes are too large.

In particular embodiments, the vehicles may receive data from and transmit data to the global server system and third-party systems. Examples of received data may include, e.g., instructions, new software or software updates, maps, 1D models, trained or untrained machine-learning models, location information, the vehicle itself, other vehicles, and target destinations, navigation information, traffic information, weather information, and any other suitable information. Examples of data transmitted from the vehicle may include, e.g., telemetry and sensor data, determinations/decisions based on such data, location, navigation data, and any other suitable data.

As another example, the vehicle may have optical cameras pointing in different directions. The cameras may be used for, e.g., recognizing roads, lane markings, street signs, traffic lights, police, other vehicles, and any other visible objects of interest. To enable the vehicle to "see" at night, infrared cameras may be installed. In particular embodiments, the vehicle may be equipped with stereo vision for, e.g., spotting hazards such as pedestrians or tree branches on the road. As another example, the vehicle may have radars for, e.g., detecting other vehicles and hazards afar. Furthermore, the vehicle may have ultrasound equipment for, e.g., parking and obstacle detection. In addition to sensors enabling the vehicle to detect, measure, and understand the external world around it, the vehicle may further be equipped with sensors for detecting and self-diagnosing the vehicle's own state and condition. For example, the vehicle may have wheel sensors for, e.g., measuring velocity; GPS for, e.g., determining the vehicle's current geolocation; and IMUs, accelerometers, gyroscopes, and odometer systems for movement or motion detection.

In particular embodiments, the vehicle may be equipped with a processing unit (e.g., one or more CPUs and CPUs), memory, and storage. The vehicle may thus be equipped to perform a variety of computational and processing tasks, including processing the sensor data, extracting useful information, and operating accordingly. For example, based on images captured by its cameras and a machine-vision model, the vehicle may identify particular types of objects captured by the images, such as pedestrians, other vehicles, lanes, curbs, and any other objects of interest.

In particular embodiments, the vehicle may have a navigation system responsible for safely navigating the vehicle. In particular embodiments, the navigation system may take as input any type of sensor data from, e.g., a GPS module, IMU, LiDAR sensors, optical cameras, radio frequency (RF) transceivers, or any other suitable telemetry or sensory mechanisms. The navigation system may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system may use its determinations to control the vehicle to operate in prescribed manners and to guide the vehicle to its destinations without colliding into other objects. Although the physical embodiment of the navigation system (e.g., the processing unit) appears in a particular location on the vehicle, navigation system may be located in any suitable location in or on the vehicle. Example locations for navigation system include inside the cabin or passenger compartment of the vehicle, near the engine/battery, near the front seats, rear seats, or in any other suitable location.

Figure 9:
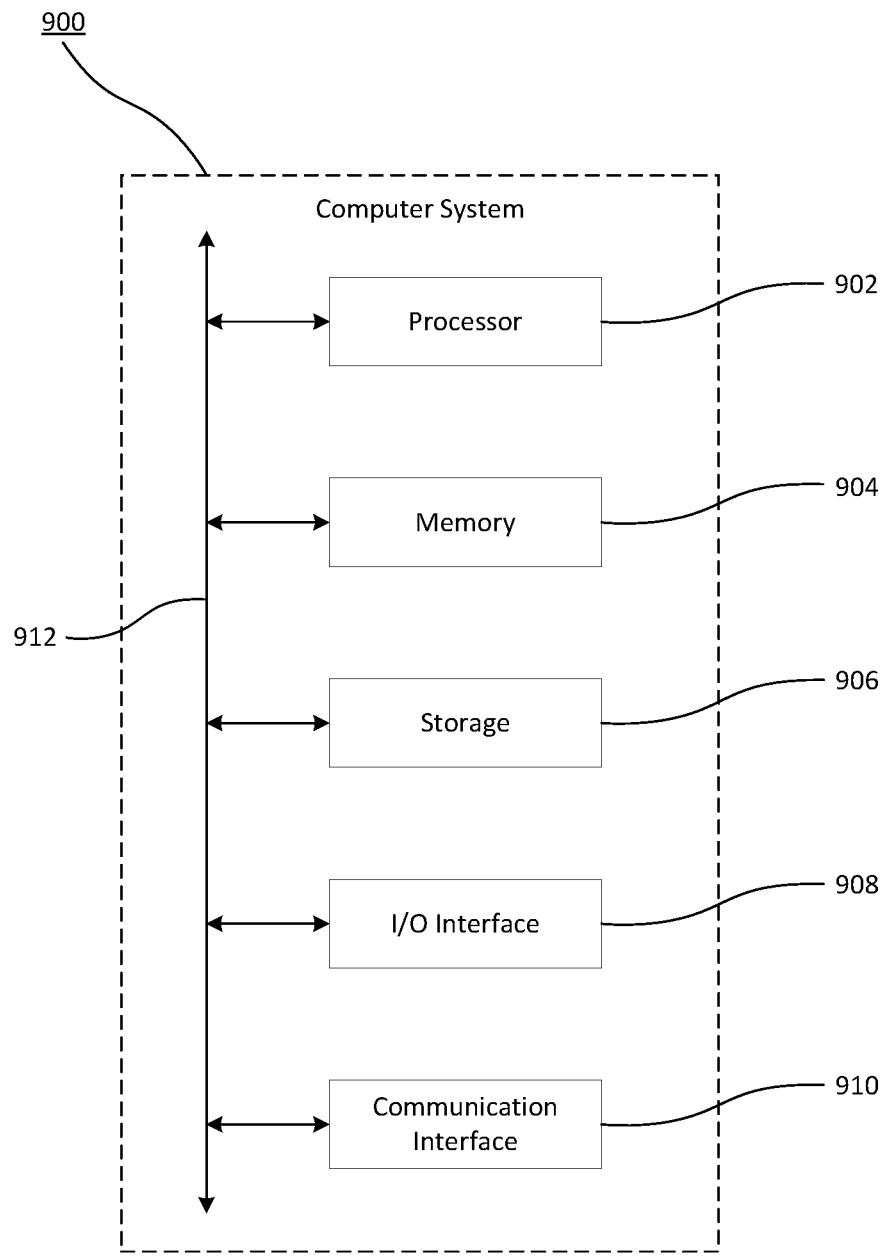
FIG. 9 shows an illustration of a computer architecture that can be used with at least some of the described embodiments.

With reference to FIG. 9, an example computer system 900 will now be described. In particular embodiments, the example computer system 900 may be configured to perform one or more functions of one or more methods described or illustrated herein either alone or in combination with one or more other computer systems (which may take a similar form to computer system 900). In particular embodiments, software running on computer system 900 may enable computer system 900 to perform one or more functions of one or more methods described or illustrated herein. Herein, a reference to a computer system may encompass a computing device, and vice versa, where appropriate. Moreover, a reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centres; or reside in a cloud, which may include one or more cloud components in one or more networks. Where appropriate, one or more computer systems may perform one or more functions of one or more methods described or illustrated herein without substantial spatial or temporal limitation. As an example, and not by way of limitation, one or more computer systems may perform in real time or in batch mode one or more functions of one or more methods described or illustrated herein. One or more computer systems may perform one or more functions of one or more methods described or illustrated herein at different times or at different locations, where appropriate.

In particular embodiments, computer system 900 includes at least one processor 902, non-transitory computer readable media such as memory 904 and storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing program instructions, including but not limited to program instructions for carrying out one or more functions of one or more methods described or illustrated herein. As an example and not by way of limitation, to execute program instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 that are to be operated on by computer instructions; the results of previous instructions executed by processor 902 that are accessible to subsequent instructions or for writing to memory 904 or storage 906; or any other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs), be a multi-core processor, or may include multiple processing units. Although this disclosure describes and illustrates a particular processor, this disclosure contemplates any suitable processor.

In particular embodiments, memory 904 includes main memory for storing instructions for processor 902 to execute or data for processor 902 to operate on. As an example, and not by way of limitation, computer system 900 may load instructions from storage 906 or another source (such as another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described in further detail below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may also include multiple memory units, where appropriate. Although this disclosure describes and illustrates particular memory, this disclosure contemplates any suitable memory.

In particular embodiments, storage 906 includes storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may also include multiple storage units. Although this disclosure describes and illustrates particular storage, this disclosure contemplates any suitable storage.

In particular embodiments, I/O interface 908 includes hardware or software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may also include multiple I/O interface units, where appropriate. Although this disclosure describes and illustrates a particular I/O interface, this disclosure contemplates any suitable I/O interface.

In particular embodiments, communication interface 910 includes hardware or software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 900 may include any suitable communication interface 910 for any of these networks, where appropriate. Communication interface 910 may also include multiple communication interface units, where appropriate. Although this disclosure describes and illustrates a particular communication interface, this disclosure contemplates any suitable communication interface.

In particular embodiments, bus 912 includes hardware or software, or both coupling components of computer system 900 to each other. As an example and not by way of limitation, bus 912 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may also include multiple bus units, where appropriate. Although this disclosure describes and illustrates a particular bus, this disclosure contemplates any suitable bus or interconnect.

The computing entities may be communicatively connected over any suitable network. As an example and not by way of limitation, one or more portions of network may include an ad hoc network, an extranet, a virtual private network (VPN), a LAN, a wireless LAN (WLAN), a WAN, a wireless WAN (WWAN), a MAN, a portion of the Internet, or a combination of any of the above. In particular embodiments, any suitable network arrangement and protocol enabling the computing entities to communicate with each other may be used. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof.

Example embodiments may include one or more server computers. Each server may be a unitary server or a distributed server spanning multiple computers or multiple data centres. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server.

Example embodiments may include one or more data stores. The data stores may be used to store various types of information, historical information, third-party information, or any other suitable type of information. In particular embodiments, the information stored in the data stores may be organized according to specific data structures. In some embodiments, each data store may be a relational, columnar, correlation, or any other suitable type of database system. Although this disclosure describes or illustrates particular types of databases, this disclosure contemplates any suitable types of databases. Some embodiments may further provide interfaces that enable a user to process, transform, manage, retrieve, modify, add, or delete the information stored in the data store.

In embodiments, raw and/or processed image data may be stored within a cloud storage which may be accessed through a web service application programming interface (API) or by applications that utilize the API, such as a cloud desktop storage, a cloud storage gateway, or web-based content management systems. Typically, data may be stored locally or remotely in order to efficiently access data. For image data obtained of the real world, decryption keys may be used in order to limit the access of data and securely store the data obtained by the use of image sensors.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Many variations to the example method are possible. It should be appreciated that there can be additional, fewer, or alternative steps performed in similar or alternative orders, or in parallel, within the scope of the various embodiments discussed herein unless otherwise stated.

For example, where an image sensor is used in any aspect or embodiment, this can be in the form of any or any combination of: a camera; a stereo camera; a high resolution camera; a low resolution camera; a video camera; or a still camera.

Any system feature as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

We claim:

1. A computer-implemented method comprising:
    receiving first data of one or more geographical environments from comprising first sensor data captured by a first type of localization sensor associated with a vehicle;
    receiving second data of the one or more geographical environments from comprising second sensor data captured by a second type of localization sensor associated with the vehicle;
    generating (i) a first set of submaps from the first data and (ii) a second set of submaps from the second data;
    determining (i) a first set of constraints from the first data, wherein the first set of constraints comprises one or both of intra-submap constraints or inter-submap constraints for the first set of submaps, and (ii) a second set of constraints from the second data, wherein the second set of constraints comprises one or both of intra-submap constraints or inter-submap constraints for the second set of submaps;
    merging the first set of constraints determined from the first data with the second set of constraints determined from the second data to form a combined set of constraints; and
    applying a combined optimization process to the first set of submaps, the second set of submaps, and the combined set of constraints, wherein the combined optimization process functions to:
        determine a single combined trajectory of the vehicle that minimizes an overall error relative to the combined set of constraints;
        generate a first map that is (i) built from both the first data and the second data and (ii) thereafter utilized to localize a first set of vehicles that are installed with the first type of localization sensor but not the second type of localization sensor; and
        generate a second map that is (i) built from both the first data and the second data and (ii) thereafter utilized to localize a second set of vehicles that are installed with the second type of localization sensor but not the first type of localization sensor.

2. The computer-implemented method of claim 1, wherein the first map comprises a first three-dimensional representation of geographical environments that is used to localize the first set of vehicles and the second map comprises a second three-dimensional representation of geographical environments that is used to localize the second set of vehicles.

3. The computer-implemented method of claim 1, wherein the first set of submaps is generated using a simultaneous localization and mapping method.

4. The computer-implemented method of claim 3, wherein the second set of submaps is generated using feature detection.

5. The computer-implemented method of claim 4, wherein the second set of submaps is refined using a structure from motion method.

6. The computer-implemented method of claim 3, wherein the first set of submaps is refined using a loop closure technique.

7. The computer-implemented method of claim 1, wherein the first data and second data are correlated using temporal data to determine one or more relationships between the first and second types of localization sensors.

8. The method of claim 7, wherein output from the first type of localization sensor and second type of localization sensor are synchronized.

9. The computer-implemented method of claim 1, wherein each of the first and second types of localization sensors comprises one or more of: a Light Detection and Ranging (LiDAR) sensor, a Radio Detection and Ranging (Radar) sensor, a Sound Navigation and Ranging (Sonar) sensor, an Inertial Navigation System, a Global Positioning System, an Inertial Measurement Unit, or an image sensor.

10. The computer-implemented method of claim 1, wherein each of the first and second data comprises any one or more of: depth information; point cloud data; or image data.

11. The computer-implemented method of claim 1, wherein the first data further comprises sensor data captured by one or more additional sensors corresponding to the first type of localization sensor.

12. The computer-implemented method of claim 1, wherein the second data further comprises sensor data captured by one or more additional sensors corresponding to the second type of localization sensor.

13. The computer-implemented method of claim 1, wherein the combined set of constraints includes constraints generated from one or more of inertial measurement unit (IMU) data or inertial navigation system (INS) data.

14. The computer-implemented method of claim 1, wherein the combined set of constraints includes both (i) constraints generated using a loop closure technique and (ii) constraints generated using a structure from motion method.

15. The computer-implemented method of claim 1, wherein the combined set of constraints includes constraints that relate relative poses of the vehicle between different positions of the vehicle at different times over the vehicle's trajectory.

16. The computer-implemented method of claim 1, wherein the first map and the second map are correlated to a same coordinate frame.

17. A non-transitory computer-readable medium comprising program instructions stored thereon that, when executed by at least one processor of a computing system, cause the computing system to perform functions comprising:
  receiving first data of one or more geographical environments comprising first sensor data captured by a first type of localization sensor associated with a vehicle;
  receiving second data of the one or more geographical environments comprising second sensor data captured by a second type of localization sensor associated with the vehicle;
  generating (i) a first set of submaps from the first data and (ii) a second set of submaps from the second data;
  determining (i) a first set of constraints from the first data, wherein the first set of constraints comprises one or both of intra-submap constraints or inter-submap constraints for the first set of submaps, and (ii) a second set of constraints from the second data, wherein the second set of constraints comprises one or both of intra-submap constraints or inter-submap constraints for the second set of submaps;
  merging the first set of constraints determined from the first data with the second set of constraints determined from the second data to form a combined set of constraints; and
  applying a combined optimization process to the first set of submaps, the second set of submaps, and the combined set of constraints, wherein the combined optimization process functions to:
    determine a single combined trajectory of the vehicle that minimizes an overall error relative to the combined set of constraints;
    generate a first map that is (i) built from both the first data and the second data and (ii) thereafter utilized to localize a first set of vehicles that are installed with the first type of localization sensor but not the second type of localization sensor; and
    generate a second map that is (i) built from both the first data and the second data and (ii) thereafter utilized to localize a second set of vehicles that are installed with the second type of localization sensor but not the first type of localization sensor.

18. The non-transitory computer-readable medium of claim 17, wherein:
  the first set of submaps is generated using a simultaneous localization and mapping method;
  the second set of submaps is generated using feature detection;
  the second set of submaps is refined using a structure from motion method; and
  the first set of submaps is refined using a loop closure technique.

19. A computing system comprising:
  at least one processor, a non-transitory computer-readable medium; and
  program instructions stored on the non-transitory computer-readable medium that are executable by the at least one processor such that the computing system is configured to perform functions comprising:
    receiving first data of one or more geographical environments comprising first sensor data captured by a first type of localization sensor associated with a vehicle;
    receiving second data of the one or more geographical environments comprising second sensor data captured by a second type of localization sensor associated with the vehicle;
    generating (i) a first set of submaps from the first data and (ii) a second set of submaps from the second data;
    determining (i) a first set of constraints from the first data, wherein the first set of constraints comprises one or both of intra-submap constraints or inter-submap constraints for the first set of submaps, and (ii) a second set of constraints from the second data, wherein the second set of constraints comprises one or both of intra-submap constraints or inter-submap constraints for the second set of submaps;

merging the first set of constraints determined from the first data with the second set of constraints determined from the second data to form a combined set of constraints; and applying a combined optimization process to the first set of submaps, the second set of submaps, and the combined set of constraints, wherein the combined optimization process functions to:

determine a single combined trajectory of the vehicle that minimizes an overall error relative to the combined set of constraints;

generate a first map that is (i) built from both the first data and the second data and (ii) thereafter utilized to localize a first set of vehicles that are installed with the first type of localization sensor but not the second type of localization sensor; and generate a second map that is (i) built from both the first data and the second data and (ii) thereafter utilized to localize a second set of vehicles that are installed with the second type of localization sensor but not the first type of localization sensor.

20. The computing system of claim 19, wherein the first map comprises a first three-dimensional representation of geographical environments that is used to localize the first set of vehicles and the second map comprises a second three-dimensional representation of geographical environments that is used to localize the second set of vehicles.

* * * * *